United States Patent
Mertens et al.

(10) Patent No.: US 6,280,068 B1
(45) Date of Patent: Aug. 28, 2001

(54) VEHICLE EXTERNAL REARVIEW MIRROR WITH REAR FACING BLINKER LIGHT

(75) Inventors: Jens Mertens; Hubert Zwick, both of Stuttgart (DE)

(73) Assignee: Reitter & Schefenacker GmbH & Co. KG (DE)

(*) Notice: Subject to any disclaimer, the term of this patent is extended or adjusted under 35 U.S.C. 154(b) by 0 days.

(21) Appl. No.: 09/430,233

(22) Filed: Oct. 29, 1999

(30) Foreign Application Priority Data

Oct. 29, 1998 (DE) .......................................... 298 19 279 U

(51) Int. Cl.⁷ ........................................................ B60R 1/12
(52) U.S. Cl. ........................... 362/494; 362/459; 362/487; 362/540
(58) Field of Search .................................... 362/459, 487, 362/494, 540, 546, 548, 135, 136, 138

(56) References Cited

U.S. PATENT DOCUMENTS

| | | | |
|---|---|---|---|
| 2,457,348 | * 12/1948 | Chambers | 362/540 |
| 5,436,741 | * 7/1995 | Crandall | 359/15 |
| 5,499,169 | * 3/1996 | Chen | 362/494 |

* cited by examiner

Primary Examiner—Sandra O'Shea
Assistant Examiner—Ismael Negro
(74) Attorney, Agent, or Firm—R. W. Becker & Associates; R W. Becker

(57) ABSTRACT

An external rearview mirror for a vehicle includes a base for attachment to a vehicle, a mirror head connected to the base, and a holder for a mirror glass. A blinker light on the mirror head provides light which is radiated rearwardly, as viewed in the direction of forward travel of the vehicle. The rearward light is radiated at an angle of at least 55 degrees relative to a straight line that is parallel to the longitudinal axis of the vehicle and that substantially extends beyond the contour of the mirror head.

13 Claims, 1 Drawing Sheet

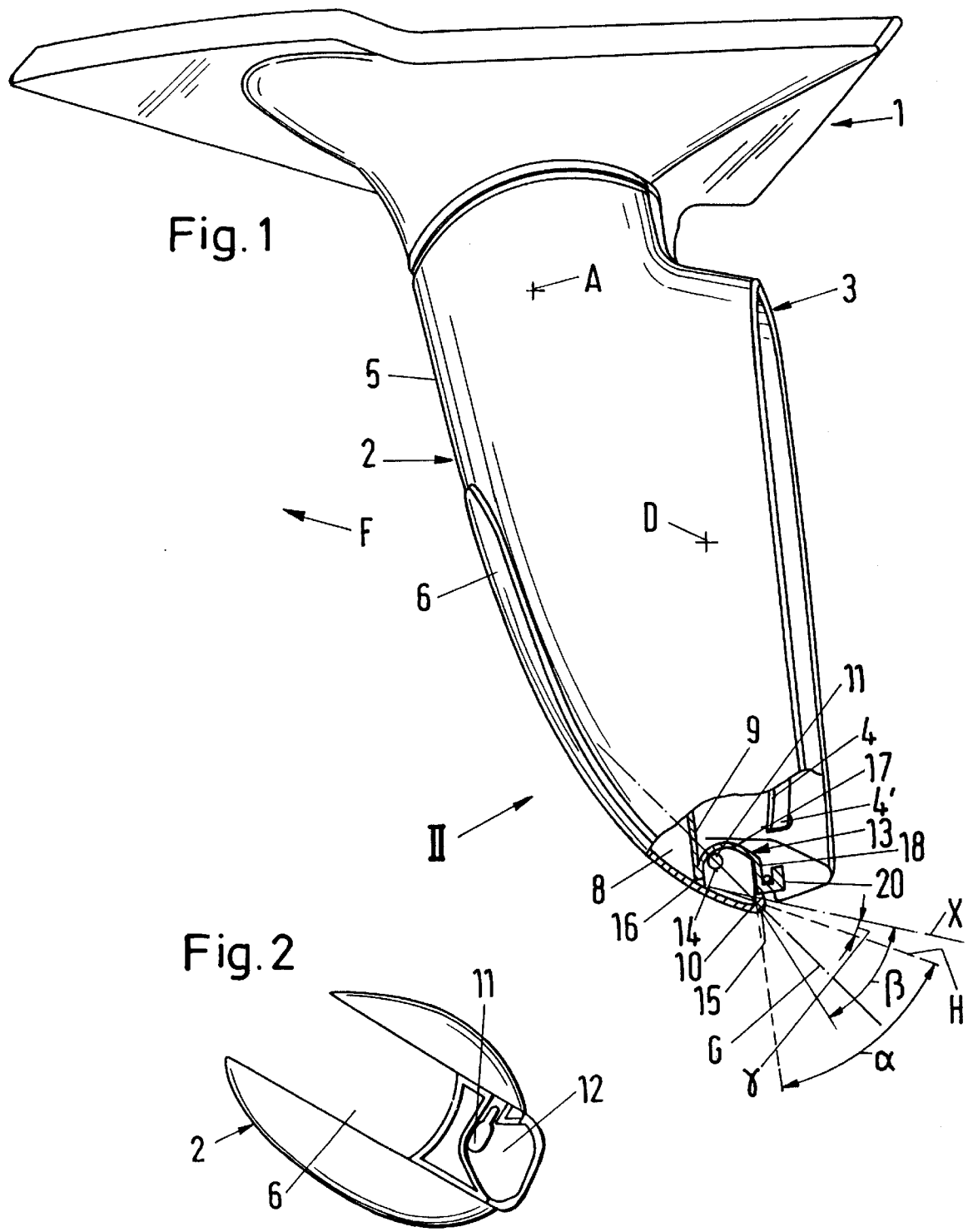

VEHICLE EXTERNAL REARVIEW MIRROR WITH REAR FACING BLINKER LIGHT

BACKGROUND OF THE INVENTION

The present invention relates to an external rearview mirror for a vehicle, especially a motor vehicle, and includes a mirror base, and a mirror head that has a mirror glass holder and in which is accommodated at least one blinker light that is disposed behind a light window.

External rearview mirrors are known where the mirror head can be swung or folded toward the rear (as viewed in the direction of travel of the vehicle), relative to the mirror base manually and/or by means of a motor. In addition, the mirror glass holder in the mirror head can generally be adjusted from the interior of the vehicle. As a result, the driver is ensured of a satisfactory view, resulting in high traffic safety. Such external rearview mirrors have a blinker light that is provided on the front side of the mirror housing as viewed in the direction of travel. However, for other users of the road that are next to or behind the external rearview mirror the blinker lights cannot be seen or at best can be seen only unsatisfactorily.

It is therefore an object of the present invention to improve an external rearview mirror of the aforementioned general type in such a way that other users of the road that in the direction of travel are next to or behind the external rearview mirror can also satisfactorily recognize radiation emitted by the blinker lights.

BRIEF DESCRIPTION OF THE DRAWING

This object, and other objects and advantages of the present invention, will appear more clearly from the following specification in conjunction with the accompanying schematic drawing, in which:

FIG. 1 is a partially cross-sectioned top view of one exemplary embodiment of the inventive external rearview mirror; and FIG. 2 is a view taken in the direction of the arrow 11 in FIG. 1.

SUMMARY OF THE INVENTION

The external review mirror of the present invention is characterized primarily in that a blinker light is disposed in the mirror head in such a way that light given off by such blinker light is radiated rearwardly, as viewed in the direction of forward travel of the vehicle, over an angle of at least 55° relative to a straight line that is parallel to the longitudinal axis of the vehicle and that substantially extends beyond the contour of the mirror head.

The blinker light of the inventive external rearview mirror radiates the light over a large angular range at an angle toward the rear, so that other users of the road that are next to or behind the external rearview mirror can reliably and clearly recognize the intention of the driver of the vehicle to turn toward the right or toward the left. In this way, a high traffic safety is ensured.

Further specific features of the present invention will be described in detail subsequently.

DESCRIPTION OF PREFERRED EMBODIMENTS

Referring now to the drawing in detail, the external rearview mirror has a mirror base 1 by means of which, in a known manner, it is preferably secured to a motor vehicle. The external rearview mirror is furthermore provided with a mirror head 2, which in turn is mounted in a known manner to the mirror base 1 in such a way that it can swing or fold about an axis A.

The mirror head 2 has a mirror housing 3 in which is accommodated a mirror glass holder 4 that is adjustably mounted by means of a non-illustrated pivot joint. The mirror glass holder 4 carries a mirror glass 4'. The adjustment of the mirror glass holder 4 about a pivot point D can be effected manually or via an electric motor from the interior of the vehicle.

The mirror housing 3 is provided on its forwardly facing side 5, as viewed in the direction of forward travel F, with a light window 6 that extends transverse to the direction of travel F from the outer end of the mirror head 2 in a direction toward the mirror base 1. The light window 6 is advantageously disposed within the contour of the mirror housing 3. The light window 6 covers an installation chamber 8 in which is disposed at least one non-illustrated blinker light. Such a blinker light can be formed by one or more LEDs, electric bulbs, neon tubes, or photo-conducting material. On a side opposite the direction of travel F, the installation chamber 8 is delimited by a partition 9, which is provided in the mirror housing 3. The light window 6 is made of light-transparent material, such as glass, plastic or the like. Non-illustrated known lenses or prism elements are preferably provided at the back side of the light window 6 in order to optimally refract the light that is forwardly transmitted from the blinker light as viewed in the direction of travel F.

That end portion 10 of the light window 6 that is the most remote from the mirror base 1 covers a further blinker light 11, the light of which is radiated substantially rearwardly, as viewed in the direction of travel F, but in part is also radiated laterally at an angle a of up to 60° relative to the longitudinal axis of the vehicle. The blinker light 11 is disposed in an installation chamber 12 that is provided in the mirror housing 3 and that is delimited by a portion of the partition 9 and the light window 6, as well as by a reflector 13. The reflector is embodied as an ellipsoid reflector, the two focal points 14 and 15 of which are disposed on a straight line G that is disposed at an acute angle relative to the longitudinal axis of the vehicle, and in the illustrated embodiment is disposed at an angle of about 40°.

The reflector 13 is preferably integrally formed with the partition 9, which on that side facing away from the mirror base 1 extends nearly to the light window 6. At this end 16, the reflector 13 adjoins a portion 17, the cross-sectional contour of which is curved in the manner of a partial circle. The curved portion 17 adjoins the end portion 10 of the light window 6 by means of a side wall 18 that extends approximately perpendicular to the plane of connection of the mirror base 1 to the vehicle. As illustrated in FIG. 1, the transition of the side wall 18 into the end portion 10 of the light window 6 is disposed at the furthest point from the mirror base 1. This transition region extends beyond the adjacent portion 20 of the mirror housing 3 in the rear as viewed in the direction of travel F.

The blinker light 11, which is preferably an electric bulb, is disposed in the first focal point 14. Instead of an electric bulb, an LED, a photo-conductive material, or a neon tube could also be utilized, and in addition a plurality of such light means could also be provided.

The construction of the reflector 13 is such that the radiation emitted by the blinker light 11 and reflected by the reflector 13 intersect in the second focal point 15. This second focal point is disposed in the region of a tip of the light window 6 that is formed by the transition of the end portion 10 of the light window with the side wall 18. As viewed in the direction of travel F, the focal point 14 is disposed to the side next to the adjacent portion 20 of the housing 3. The straight line X that goes through the focal point 15 parallel to the longitudinal axis of the vehicle is spaced from the adjacent portion 20 of the housing 3 on that side thereof that is remote from the mirror base 1. The rays reflected by the reflector 13 exit the end portion 10 of the light window 6 rearwardly at an angle α relative to the direction of travel F. This angle of radiation α is at least 60°, measured from a straight line H that extends through the focal point 15 and is disposed at an angle y of 5° relative to the straight line X. The radiation angle α is the value prescribed by law. The light emitted by the blinker light 11 is thus clearly visible, thereby ensuring traffic safety.

Since in the manner described the focal point 15 is disposed beyond the contour of the mirror housing 3, and the side wall 18 is drawn in by an appropriate amount outwardly beyond the contour of the mirror housing, a light discharge area is provided at an angle β of 45° relative to the straight line X, with the magnitude of this light discharge area being at least 10 cm².

As a consequence of the inventive construction, the blinker light 11 fulfills the requirements set by law relative to light intensity or light value, as well as the radiation angle. The mirror housing 3 is at least nearly of the same size as a mirror housing without such an additional blinker light that when viewed in the direction of travel F radiates rearwardly. Special photo-conductive systems for fulfilling legal requirements are not necessary. The blinker light 11 ensures a high traffic safety since other users of the road, such as bicycle riders, motorcycle riders, or pedestrians, even those that are next to or somewhat behind the vehicle, can clearly and in a timely manner recognize the intention of the driver of the vehicle to make a turn.

The vehicles are advantageously provided with an external rearview mirror not only on the right side but also on the left side, with both mirrors then advantageously being provided with the inventive additional blinker light.

The specification incorporates by reference the disclosure of German priority document 298 19 279.9 of Oct. 29, 1998.

The present invention is, of course, in no way restricted to the specific disclosure of the specification and drawing but also encompasses any modifications within the scope of the appended claims.

What is claimed is:

1. An external rearview mirror for a vehicle, comprising:
   a mirror base for attachment to a vehicle;
   a mirror head connected to said mirror base and being provided with a light window and a holder for a mirror glass, wherein said mirror head is provided with a reflector and a housing, wherein a partition is disposed within said housing, and wherein said reflector and said partition are components that are separate from one another; and
   a blinker light disposed in said mirror head in front of said reflector, wherein light given off by said blinker light is radiated rearwardly, as viewed in a direction of forward travel of said vehicle, over an angle of at least 55° relative to a first straight line that is parallel to a longitudinal axis of said vehicle and that substantially extends beyond a contour of said mirror head.

2. An external rearview mirror according to claim 1, wherein said blinker light radiates over an angular range of at least 60°.

3. An external rearview mirror according to claim 1, wherein said partition delimits an installation chamber within said housing, said installation chamber being provided for at least one further blinker light that radiates light toward the front when viewed in said direction of forward travel of said vehicle.

4. An external rearview mirror according to claim 1, wherein said mirror head is further provided with a reflector, and wherein said blinker light is disposed in front of said reflector.

5. An external rearview mirror according to claim 4, wherein said mirror head is provided with a housing, wherein a partition is disposed within said housing, and wherein said reflector is integrally formed with said partition.

6. An external rearview mirror according to claim 5, wherein said partition delimits an installation chamber within said housing, said installation chamber being provided for at least one further blinker light that radiates light toward the front when viewed in said direction of forward travel of said vehicle.

7. An external rearview mirror according to claim 4, wherein said light window has a free end portion that is disposed remote from said mirror base, and wherein said reflector has a straight wall portion that adjoins said free end portion of said light window and extends approximately perpendicular to a connection surface of said mirror base to said vehicle.

8. An external rearview mirror according to claim 7, wherein said straight wall portion of said reflector adjoins a partition within said mirror head by means of a portion of said reflector that has a cross-sectional configuration that is curved in the shape of a partial circle.

9. An external rearview mirror according to claim 4, wherein said reflector is an ellipsoid reflector.

10. An external rearview mirror according to claim 9, wherein said blinker light is disposed in a focal point of said reflector.

11. An external rearview mirror according to claim 10, wherein said two focal points of said reflector are disposed on a second straight line that is disposed at an acute angle to said first straight line that extends parallel to said longitudinal axis of said vehicle.

12. An external rearview mirror according to claim 10, wherein light rays of said blinker light reflected by said reflector intersect one another in another focal point of said reflector.

13. An external rearview mirror according to claim 12, wherein said other focal point of said reflector is essentially disposed beyond said contour of said mirror head.

* * * * *